United States Patent [19]
Thomsen et al.

[11] Patent Number: 5,404,460
[45] Date of Patent: Apr. 4, 1995

[54] METHOD FOR CONFIGURING MULTIPLE IDENTICAL SERIAL I/O DEVICES TO UNIQUE ADDRESSES THROUGH A SERIAL BUS

[75] Inventors: Joseph A. Thomsen, Chandler; David R. Evoy, Tempe, both of Ariz.

[73] Assignee: VLSI Technology, Inc., San Jose, Calif.

[21] Appl. No.: 188,505

[22] Filed: Jan. 28, 1994

[51] Int. Cl.6 .............................................. G06F 13/14
[52] U.S. Cl. .................................... 395/275; 395/325; 395/DIG. 1
[58] Field of Search ................ 395/275, 325, 425; 340/825.52

[56] References Cited

U.S. PATENT DOCUMENTS

| | | | |
|---|---|---|---|
| 4,556,953 | 12/1985 | Caprio et al. | 395/325 |
| 4,617,566 | 10/1986 | Diamond | 340/870.11 |
| 4,660,141 | 4/1987 | Ceccon et al. | 395/275 |
| 4,730,251 | 3/1988 | Aakre et al. | 395/325 |
| 4,740,916 | 4/1988 | Martin | 395/425 |
| 4,750,136 | 6/1988 | Arpin et al. | 364/514 |
| 4,773,005 | 9/1988 | Sullivan | 395/275 |
| 5,038,317 | 8/1991 | Callan et al. | 395/325 |
| 5,077,684 | 12/1991 | Kitajima | 395/275 |
| 5,175,822 | 12/1992 | Dixon et al. | 395/275 |
| 5,204,669 | 4/1993 | Dorfe et al. | 340/825.52 |
| 5,274,771 | 12/1993 | Hamilton et al. | 395/275 |

*Primary Examiner*—Parshotam S. Lall
*Assistant Examiner*—Viet Vu
*Attorney, Agent, or Firm*—Harry M. Weiss

[57] ABSTRACT

An electronic system has multiple identical Input/Output (I/O) devices which are all connected in daisy-chain fashion on a serial bus. At power-up or reset, the I/O device at the end of the chain configures itself as Device 0, and outputs data to the next device which configures it as Device 1. Device 1 then outputs data to the next device which configures it as Device 2, and so on until all the I/O devices have been assigned a device number. In this manner the I/O devices are configured to unique addresses without additional external pins or intervention by the System Controller, minimizing package size and eliminating logic which would otherwise be required if the System Controller had to configure these I/O devices.

6 Claims, 5 Drawing Sheets

METHOD FOR CONFIGURING MULTIPLE IDENTICAL SERIAL I/O DEVICES TO UNIQUE ADDRESSES THROUGH A SERIAL BUS

RELATED APPLICATION

This patent application is related to the patent application entitled "SERIAL BUS I/O SYSTEM AND METHOD FOR SERIALIZING INTERRUPT REQUESTS AND DMA REQUESTS IN A COMPUTER SYSTEM", filed concurrently herewith and assigned to the same assignee, and is incorporated herein by reference.

BACKGROUND OF THE INVENTION

1. Field of the Invention

This invention generally relates to electronic Input/Output (I/O) devices, and, more specifically, relates to a method for configuring multiple identical serial I/O devices to unique addresses through a serial bus.

2. Description of the Related Art

Electronic systems that have components that communicate via a serial bus are well-known in the prior art. When several identical I/O devices are present on the same serial bus, there must be a way to assign each I/O device a unique identification number or address space. This can be accomplished by providing address inputs to each I/O device, and by either hardwiring these inputs to unique values or by driving these inputs to unique values with external logic. However, providing address inputs to uniquely identify each I/O device requires external pins on the I/O device package.

An alternative method of uniquely identifying identical I/O devices is to provide a unique select signal for each I/O device that is activated by external logic when the I/O device needs to be active. This requires an external pin on the I/O device package, and complex circuitry that actively monitors and controls each I/O device, resulting in a system that is more complex and that consumes more power than is desirable.

The trend in electronic systems is towards miniaturization, as shown by the success in the marketplace of laptop and notebook computers, and hand-held video games such as the Nintendo Game Boy. As the size of these systems shrinks, the pin count on their components becomes a significant limiting factor in further decreasing the size of the end product. Many systems are conserving pins by taking certain functions that used to occur in parallel format, and implementing these functions instead in a serial format. In this manner a parallel data transfer that used to take eight data bits and a control bit for handshaking (nine bits total) can be implemented in serial format, which requires only two pins, one for serial data and another for the control bit.

One specific example of reducing pin count by serializing functions previously accomplished in parallel is found in the VL82C480 chipset by VLSI. To minimize the number of pins required to support a traditional ISA bus, the VL82C480 put the DMA Request (DRQ) and Interrupt Request (IRQ) inputs that service the ISA bus into a parallel to serial converter, and used the resulting serial stream to determine the state of the DRQ and IRQ inputs. This serial stream had a dedicated bit for each DRQ and IRQ input. This serialization of DRQs and IRQs introduces latency to these signals due to the time required to serialize the data, the time required to shift out this data serially, and the time required to convert this serial data back to parallel format. For the case of a DMA Request, excessive latency could result in the DRQ input being asserted after the service of the DMA is no longer required, resulting in overflowing or underflowing the DMA data transfer. For the case of an Interrupt Request, excessive latency could cause the IRQ input to be asserted when an interrupt is no longer present, resulting in the CPU servicing the Interrupt Request needlessly. For these reasons the latency of the serial stream is critical and must be minimized.

In today's miniature electronic systems, which are typically battery-powered, the pin count of components, total parts count and size, and power consumed are of primary importance. The additional pins required to differentiate in hardware between identical I/O devices increases the total pins on the I/O device. If external logic is used to differentiate between identical I/O devices, this logic adds complexity, uses precious real estate on the printed circuit boards, and consumes power.

Therefore, there existed a need to provide a method for configuring identical I/O devices which communicate on a common serial bus without using any additional pins or external logic, and which provides minimum latency for the signals on the serial bus.

SUMMARY OF THE INVENTION

According to one embodiment of the present invention, a system controller, peripheral controller, and several identical I/O devices are all coupled together in a daisy-chain arrangement on a serial bus. This daisy-chain arrangement implies that the serial data output of one device is connected to the serial data input of the following device. Upon power-up or system reset, the I/O devices do not know their addresses with respect to one another or their placement within the system. However, these devices monitor their serial data input to determine their respective addresses. The I/O device at the end of the daisy chain has a grounded serial data input, which signals this device that it is I/O device #0. I/O device #0 then outputs serial data to the next I/O device which configures this device as I/O device #1. I/O device #1 then outputs serial data to the next I/O device which configures it as I/O device #2. This continues in like manner until all the I/O devices have been configured with an identification number, which provides a unique address for each I/O device. This unique address is then used to identify the relevant I/O device when communicating with the System Controller. The I/O devices thus determine their addresses at power-up or reset without intervention by the System Controller, and without additional pins or circuitry.

According to a second embodiment according to the present invention, a non-identical I/O device is placed at the beginning of the serial bus daisy chain. This device detects the grounded serial input, and drives its serial output with a packet instructing the first identical I/O device on the serial bus to configure itself as I/O device #0. I/O device #0 then outputs serial data to the next I/O device which configures this device as I/O device #1. Configuration of I/O devices #2 and #3 proceeds the same as for the first embodiment in accordance with the present invention.

According to a third embodiment according to the present invention, a non-identical I/O device is placed somewhere in the middle of the serial bus daisy chain, between two of the identical I/O devices. The I/O device at the end of the daisy chain has a grounded serial data input, which signals this device that it is I/O device #0. I/O device #0 then outputs serial data to the next I/O device which configures this device as I/O device #1. When the non-identical I/O device encounters the serial data packet configuring the next identical I/O device, the non-identical I/O device simply passes on the serial data packet unchanged to the following I/O device. In this manner the configuration of the identical serial I/O devices occurs correctly regardless or the number of non-identical serial I/O devices on the serial bus or their position on the serial I/O bus.

The foregoing and other features and advantages will be apparent from the following description of the preferred exemplary embodiment of the invention as illustrated in the accompanying drawings.

BRIEF DESCRIPTION OF THE DRAWING

The preferred exemplary embodiment of the present invention will hereinafter be described in conjunction with the appended drawing, wherein like designations denote like elements, and.

DETAILED DESCRIPTION OF THE PREFERRED EXEMPLARY EMBODIMENTS

Figure 1:
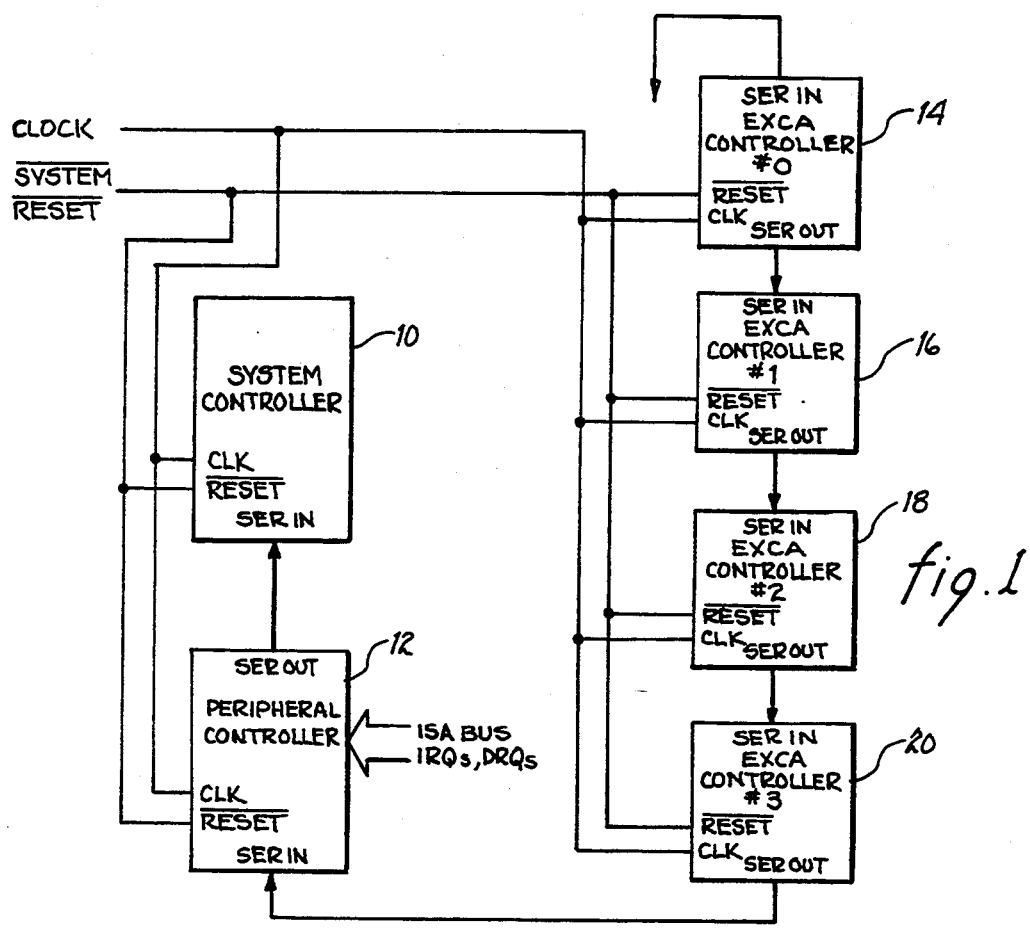
FIG. 1 is a block diagram schematic of a system which configures each identical I/O device to a different address at power-up or reset in accordance with one embodiment of the present invention.

As shown in FIG. 1, a first embodiment in accordance with the present invention comprises a System Controller 10, a Peripheral Controller 12, and four identical I/O devices 14, 16, 18 and 20 known as EXCA Controllers. Each of these devices 10, 12, 14, 16, 18, and 20 have a clock input which is connected to a common Clock source, and have a reset input which are connected to a common System Reset signal. The configuration shown in FIG. 1 is used in an IBM-compatible notebook computer system. System Controller 10 corresponds to the CPU chipset which includes an internal Interrupt Controller and an internal DMA Controller; EXCA Controllers 14, 16, 18 and 20 are expansion slots for peripherals such as .Random Access Memory (RAM), a MODEM, serial and parallel communication ports, etc.; and Peripheral Controller 12 is used to encode Interrupt Request (IRQ) and DMA Request (DRQ) information relating to the ISA bus, and to pass along serial data from EXCA Controllers 14, 16, 18 and 20 to System Controller 10.

FIG. 1 shows that the Serial In input to EXCA Controller #0 (14) is held to a constant low logic state, and that the Serial Out output of EXCA Controller #0 (14) is connected to the Serial In input of EXCA Controller #1 (16). Likewise, the Serial Out output of EXCA Controller #1 (16) is connected to the Serial In input of EXCA Controller #2 (18), and the Serial Out output of EXCA Controller #2 (18) is connected to the Serial In input of EXCA Controller #3 (20). The Serial Out output of EXCA Controller #3 (20) is connected to the Serial In input of Peripheral Controller 12, and the Serial Out output of Peripheral Controller 12 is connected to the Serial In input of System Controller 10. These daisy-chain connections from one device to the next comprise the serial bus.

The serial bus interconnects the devices of FIG. 1 as shown, providing a data path for EXCA Controllers 14, 16, 18 and 20, and Peripheral Controller 12, to communicate with System Controller 10. In a typical notebook computer application, this serial bus provides a low pin count solution for providing programmable interrupt requests (IRQ) and DMA requests (DRQ) for the peripherals coupled to EXCA Controllers 14, 16, 18 and 20. The serial bus also allows the interrupts and DMA requests from other ISA bus peripherals to be located remotely from the DMA controller and interrupt controller within System Controller 10, by coupling the IRQ and DRQ lines from the ISA Bus to Peripheral Controller 12 as shown.

The serial bus encodes SMI, IRQ, and DRQ information in a six bit packet and transmits this information serially to Peripheral Controller 12. The serial bus protocol provides for daisy chaining multiple interrupt request and DMA request sources together on a single serial stream, further minimizing the pin overhead for IRQ and DRQ support. This scheme allows multiple I/O devices to use the same IRQ level or DRQ level without these sources directly driving the same IRQ or DRQ signals.

The serial bus uses defined packets to transfer data. Each packet contains six bits of information that is equivalent to one signal in a typical ISA bus implementation. The packet can be either an interrupt request (IRQ), a DMA request (DRQ), an SMI request, or an EXCA Controller number, as shown in the table below.

| Bit # | Bit Name | Description |
| --- | --- | --- |
| 0 | Start Bit | Serial Data Output is driven low to signify the beginning of packet transmission |
| 2–1 | Packet Type | 00: EXCA Controller ID packet<br>01: SMI Request Packet<br>10: INT Request Packet<br>11: DMA Request Packet |
| 6–3 | Packet ID | For IRQ, SMI or ID types this is a binary representation of the requester or ID number. For DRQ types, bits 5–3 are a binary representation of the requestor and bit 6 is zero. |
| 7 | Stop Bit (optional) | If no more packets are queued to be transmitted, the Serial Out output will be driven to a logic 1. Otherwise, this bit will be replaced by the start bit of the next packet. |

The first bit is a Start Bit, the next two bits are a Packet Type field which identifies the type of data being sent, and the four remaining bits are Packet ID, identifying the packet. Note that an optional Stop Bit is also included if the serial data bus is idle following the packet.

The serial bus is a synchronous serial bus, with all packets transmitted synchronously to the Clock input. Data changes on the rising edge of Clock. Each device 12, 14, 16, 18 and 20 on the serial bus samples data presented to its Serial In input on the falling edge of Clock, and resynchronizes the incoming data stream before passing it on. This introduces one clock of latency for each I/O device on the serial bus, but guarantees that the data stream will always be synchronous to Clock, regardless of the number of devices on the serial bus.

Clock can be provided from an external source as shown in FIG. 1, or may be generated in one of the serial bus devices and connected to the remaining devices. Clock is typically a 25 MHz square wave in this particular example, but there is no minimum clock frequency requirement. Clock can be any frequency providing the latency on the serial bus is not so great that reliable system operation is impaired.

The arbitration algorithm for the serial bus is very simple. The higher the I/O device's position in the daisy chain, the higher its priority. This is possible due to the requirement that Start Bits for each I/O device are always a modulo 7 number of clock cycles apart. This allows each device on the serial bus to determine when it is allowed to start transmission of a packet. Since the higher priority devices are placed higher in the chain, they will keep the serial bus busy when they require service, effectively locking out lower priority devices which are lower down the chain until the serial bus goes inactive. Since a stop bit only occurs if there is no packet immediately following the current packet, a stop bit signals the I/O device receiving it that the serial bus is available for it to transmit a packet, if needed. Given the one clock cycle latency for each I/O device caused by resynchronizing incoming data to Clock, an I/O device can sense a stop bit, and begin transmitting its packet on the very next clock cycle.

To assure that the I/O devices remain synchronized to Clock, each I/O device counts the number of successive one's received on its Serial In input. When the count of ones exceeds six, the I/O device knows than an empty packet has just occurred, and the I/O device will synchronize itself to the next zero bit since it is, by definition, a start bit.

Figure 2:
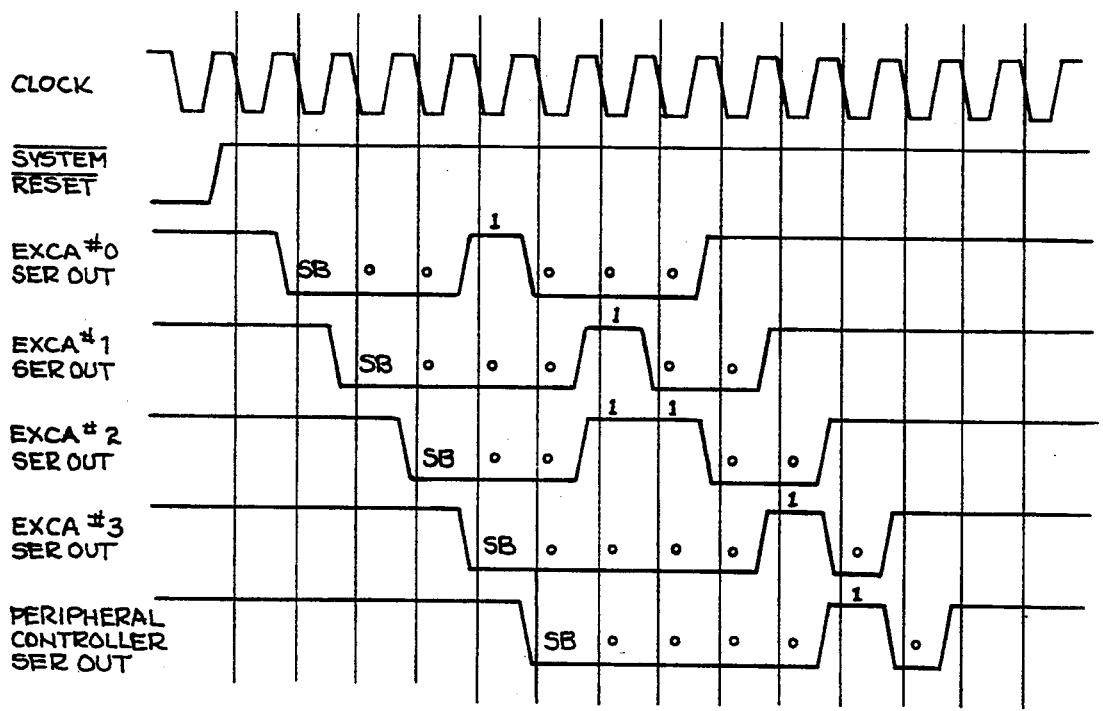
FIG. 2 is a timing diagram showing the timing sequence for the system of FIG. 1 at power-up or reset.

The operation of the system of FIG. 1 is shown by the timing diagram of FIG. 2. The serial bus can be used to transfer information regarding interrupt requests, DMA requests, and SMI requests from each EXCA Controller, as well as configuring the EXCA Controllers 14, 16, 18 and 20 to their respective assigned address spaces. The present invention relates, in this particular example, to configuring the EXCA Controllers 14, 16, 18 and 20 to their respective assigned address spaces.

An EXCA Controller transmits Packet Type 01 when it requires SMI service from System Controller 10, transmits Packet Type 10 when it requires interrupt service from System Controller 10, and transmits a Packet Type 11 when it requires service from the DMA Controller within System Controller 10. These packet types 01, 10, and 11 are not germane to the present invention, but are shown for completeness. Packet Type 00, which tells the EXCA Controller receiving the packet to configure itself as the EXCA Controller with an address corresponding to the data in the Packet ID field, is the packet type used in the method in accordance with the present invention.

Referring again to FIG. 2, system Reset is initially driven low, forcing the devices 10, 12, 14, 16, 18, and 20 to their reset states. When System Reset goes high, EXCA Controller 14 recognizes that its Serial In input is held low, and configures itself as EXCA Controller #0. It then begins to output a packet on its Serial Out output as shown in FIG. 2. This packet has a Start Bit (SB), two bits in the Packet Type field that are both low (indicating this is an EXCA Controller ID Packet), and four bits of data, indicating that the next EXCA Controller is EXCA Controller #1. EXCA Controller 16 receives this serial input, and begins outputting the packet on its Serial Out output with a one clock cycle delay. As EXCA Controller 16 receives the serial packet, it recognizes it as an EXCA Controller ID Packet, and configures itself as EXCA Controller #1 (since the data in the Packet ID field was 0001, a binary 1). It then increments the data within the Packet ID field on its Serial Out output, which is already in progress, to the next sequential binary number, in this case a 0010, indicating that the next EXCA Controller 18 is EXCA Controller #2. EXCA Controller 18 receives this serial input, and begins outputting the packet on its Serial Out output with a one clock cycle delay. As EXCA Controller 18 receives the serial packet, it recognizes it as an EXCA Controller ID packet, and configures itself as EXCA Controller #2 (since the data in the Packet ID field was 0010, a binary 2). It then increments the data within the Packet ID field on its Serial Out output, which is already in progress, to the next sequential binary number, in this case a 0011, indicating that the next EXCA Controller 18 is EXCA Controller #3. EXCA Controller 20 receives this serial input, and begins outputting the packet on its Serial Out output with a one clock cycle delay. As EXCA Controller 20 receives the serial packet, it recognizes it as an EXCA Controller ID Packet, and configures itself as EXCA Controller #3 (since the data in the Packet ID field was 0011, a binary 3). It then increments the data within the Packet ID field on its Serial Out output, which is already in progress, to the next sequential binary number, in this case a 0100, indicating that the next EXCA Controller, if there were one present, would be EXCA Controller #4. Peripheral Controller 12 receives this serial input, and outputs this same packet without modification on its Serial Out output with a one clock cycle delay. System Controller 10 receives this packet on its Serial In input, which confirms to the System Controller 10 the number of EXCA Controllers present in the system, and that these EXCA Controllers have been configured with an appropriate ID and corresponding address space. The system is then ready for operation.

The latency of the serial bus can impair system performance if it becomes too long. For this reason the IRQ and DRQ information is binarily encoded in the Packet ID field to reduce the number of bits required to communicate all IRQ and DRQ signals. The maximum latency for a single packet in the system of FIG. 1 occurs for EXCA Controller #0 (14), and is calculated as follows:

7 clocks before the start bit location
7 clocks to transmit the packet
1 clock latency for each of the three other EXCA Controllers 16, 18, and 20
1 clock latency for the Peripheral Controller 12

This results in a total of 18 clock cycles of latency. At 25 MHz, the total latency is therefore 720 nanoseconds. If two packets occur simultaneously, the worst case latency is increased by seven additional clock cycles while the first packet is transmitted, resulting in a total latency of 25 clock cycles. At 25 MHz, the worst-case latency is therefore 1 microsecond. For each additional packet that occurs simultaneously, add an additional 250 nanoseconds of latency. Note that the prior art implementation of this type of serial bus found in the VL82C480 chipset had a packet wherein each IRQ and DRQ had a separate bit. The IBM PC-AT computer has sixteen different IRQ inputs, eight different DRQ inputs, and a SMI interrupt. So the prior art implementation of the VL82C480 chipset required a minimum 26 bit serial bus packet since the data was not encoded. By encoding the data, this number is reduced from 26 bit packets to 7 bit packets, which greatly reduces the latency of the serial bus.

Figure 3:
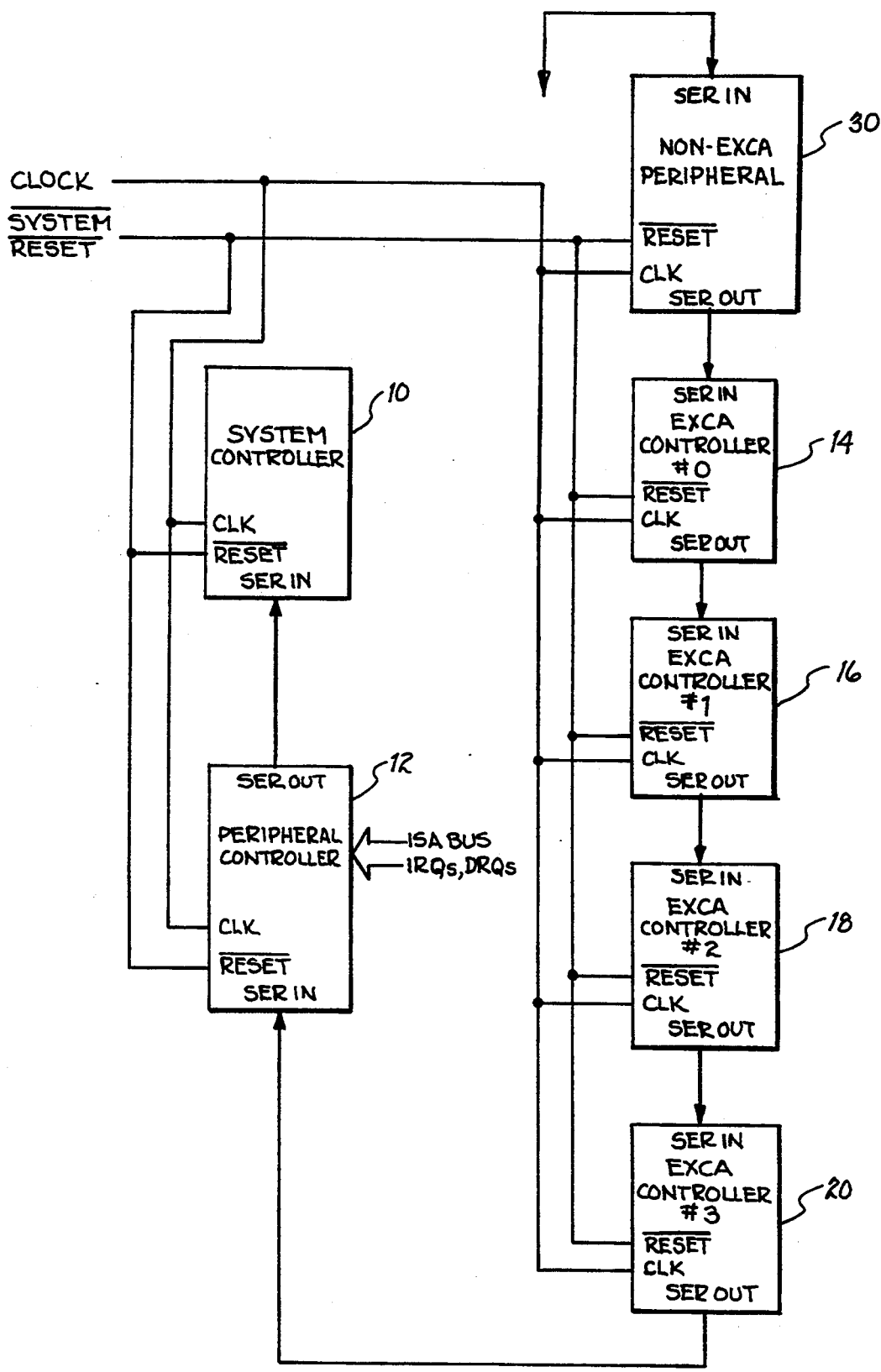
FIG. 3 is a block diagram schematic of a system which configures each identical I/O device to a different address at power-up or reset in accordance with a second embodiment of the present invention, with a non-identical I/O device at the beginning of the serial bus daisy chain.
Figure 4:
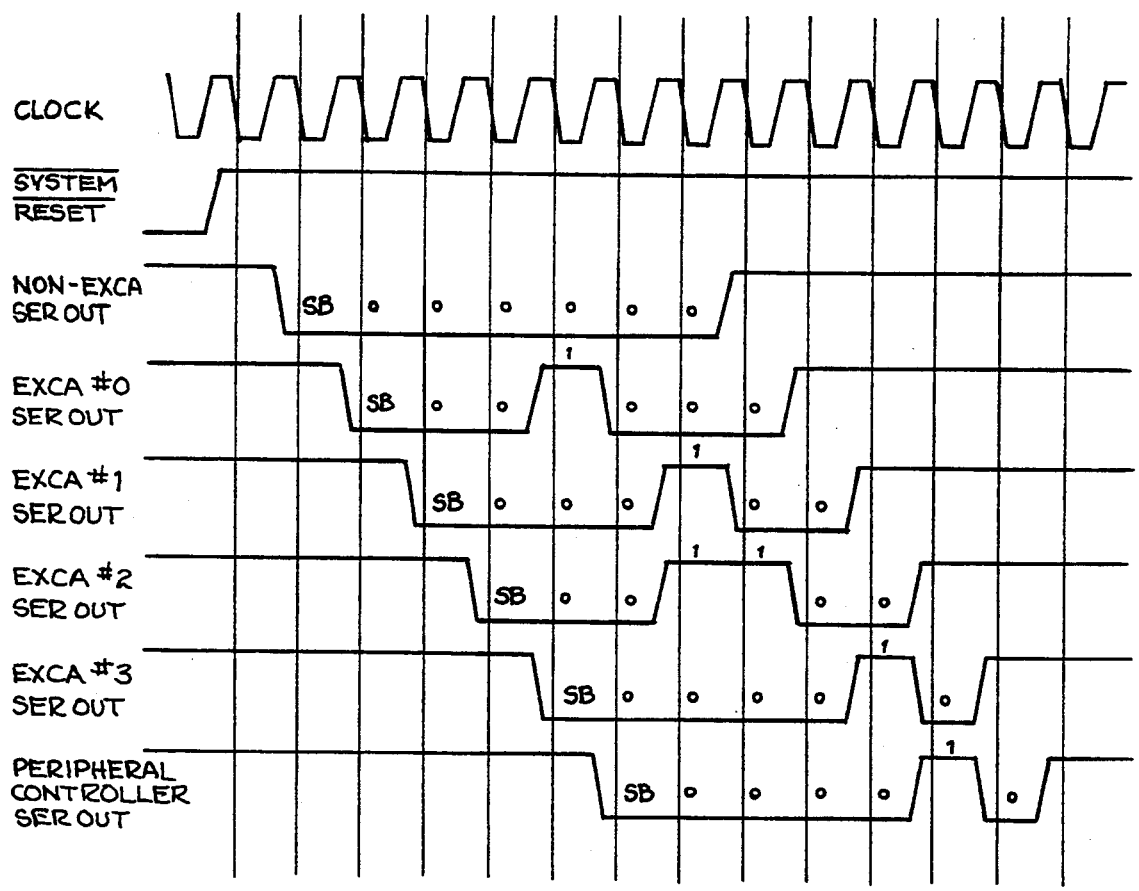
FIG. 4 is a timing diagram showing the timing sequence for the system of FIG. 3 at power-up or reset.

In a second embodiment in accordance with the present invention, a Non-EXCA Peripheral 30 is placed at the beginning of the serial bus daisy chain, as shown in FIG. 3. The serial data bus operates in the same manner as discussed with reference to the first embodiment of the present invention, with the same packet format and same general timing protocol. When the System Reset signal goes high, the Non-EXCA Peripheral 30 must recognize the need to configure the EXCA Controllers 14, 16, 18 and 20 on the serial bus. The grounded Serial In input causes the Non-EXCA Peripheral to output a packet which configures the first EXCA Controller on the serial bus to EXCA Controller #0, as shown in FIG. 4. This packet has a 00 in the Packet Type field, identifying it as an EXCA Controller ID packet, with data of 0000 to indicate that the first EXCA Controller encountered on the serial bus will be configured to be EXCA Controller #0.

EXCA Controller 14 receives this packet on its Serial In input, configures itself as EXCA Controller #0, and outputs a packet telling the next EXCA Controller to configure itself as EXCA Controller #1. EXCA Controller 16 receives this serial input, and begins outputting the packet on its Serial Out output with a one clock cycle delay. The remaining EXCA Controllers 18 and 20 are configured in the same manner as for the first embodiment of the present invention, as shown in FIG. 4.

Figure 5:
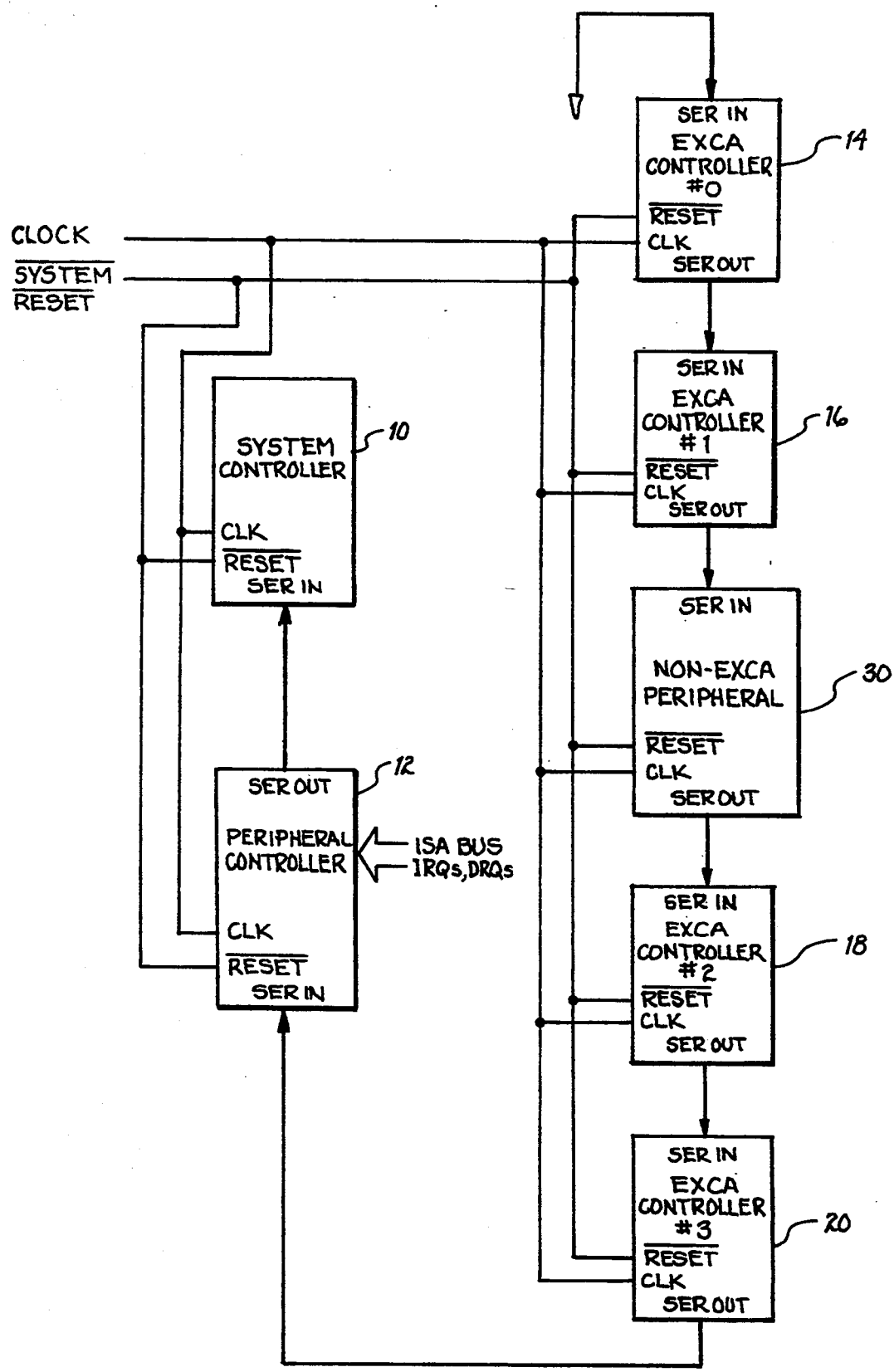
FIG. 5 is a block diagram schematic of a system which configures each identical I/O device to a different address at power-up or reset in accordance with a third embodiment of the present invention, with a non-identical I/O device in the middle of the serial bus daisy chain.
Figure 6:
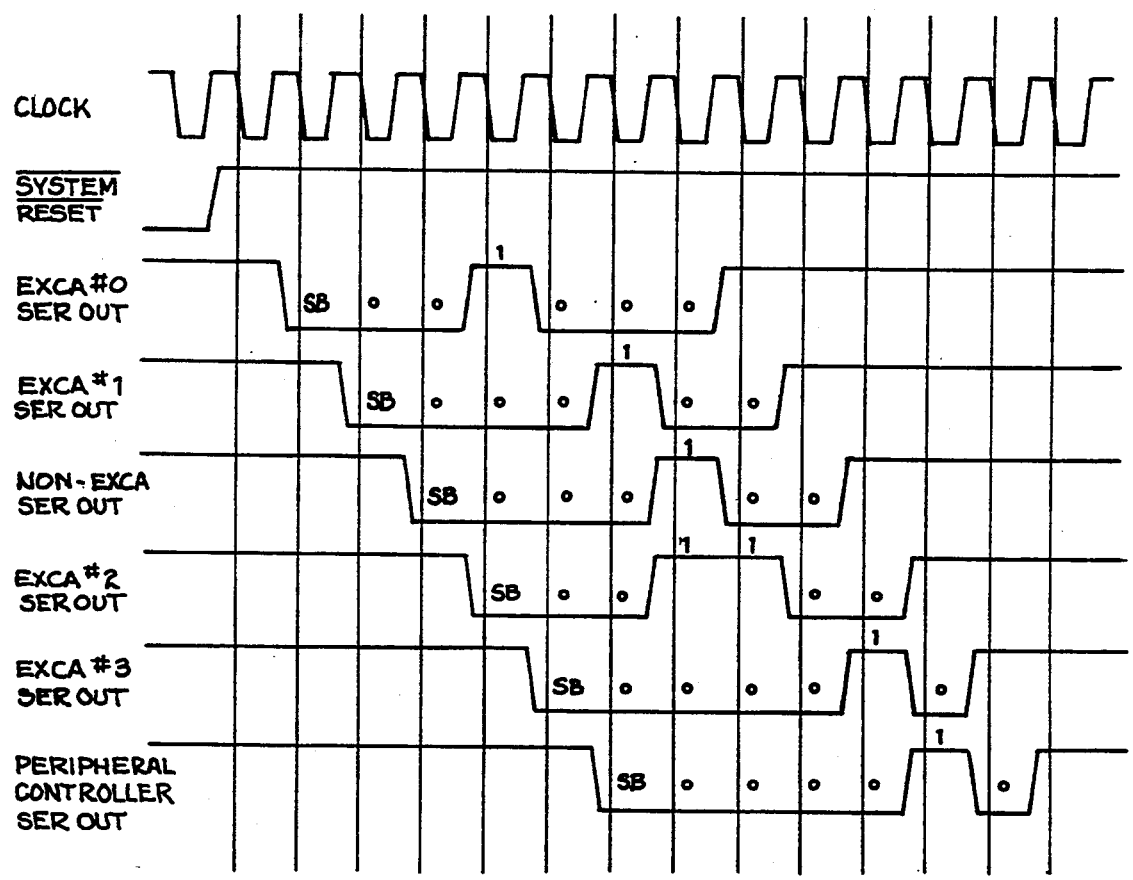
FIG. 6 is a timing diagram showing the timing sequence for the system of FIG. 5 at power-up or reset.

In a third embodiment in accordance with the present invention, a Non-EXCA Peripheral 30 is placed somewhere in the middle of the serial bus daisy chain, as shown in FIG. 5. The serial data bus operates in the same manner as discussed with reference to the first and second embodiments of the present invention, with the same packet format and same general timing protocol. When the System Reset signal goes high, EXCA Controller 14 recognizes that its serial input is held low, and configures itself as EXCA Controller #0. It then begins to output a packet on its Serial Out output as shown in FIG. 6, which is identical to the operation of EXCA Controller 14 in the first embodiment of the present invention, as shown in FIG. 2. The only difference in the operation of the system of FIG. 1 and the system of FIG. 5 is that the Non-EXCA Peripheral 30 of FIG. 5 must pass through the EXCA Controller ID packet to EXCA Controller 16 without change as shown in FIG. 6, since the Non-EXCA Peripheral 30 is not configured as an EXCA Controller.

It is thus apparent from these three embodiments described above that this method of having the EXCA Controllers configured via the serial bus can be accomplished with a number of different non-EXCA peripherals on the same serial bus and at various locations, allowing great system flexibility. In addition, no additional pins are used to configure the EXCA Controllers to their respective ID numbers, and no external circuitry is required. In this manner the amount of circuitry and power consumption for the system are minimized, and package size for the EXCA Controllers is also minimized.

While the invention has been described in its preferred exemplary embodiment, it is to be understood that the words which have been used are words of description rather than limitation, and that changes may be made within the purview of the appended claims without departing from the true scope and spirit of the invention in its broader aspects. For example, the EXCA Controllers described herein are shown for illustrative purposes only, and any type of suitable serial I/O device could be substituted for the EXCA Controllers within the scope of the present invention. It will be understood that, while various of the conductors (connections) are shown in the drawing as single lines, they are not so shown in a limiting sense, and may comprise plural conductor (connections), as is understood in the art.

What is claimed is:

1. A method for configuring multiple identical serial Input/Output (I/O) devices to unique addresses comprising the steps of:
    providing a plurality of said identical serial I/O devices each having a serial input, a serial output, a reset input, and a clock input;
    coupling the plurality of said identical serial I/O devices in a sequential order by coupling the serial input of a first of said plurality of said identical serial I/O devices to a constant logic state, and by coupling the serial output of each of said plurality of said identical serial I/O devices to the serial input of the next of said plurality of said identical serial I/O devices in said sequential order;
    providing a clock signal to the clock input of each of said plurality of said identical serial I/O devices;
    providing a reset signal to the reset input of each of said plurality of said identical serial I/O devices, the assertion of said reset signal placing each of said plurality of said identical serial I/O devices in a known configuration wherein, upon negation of said reset signal, each of said plurality of said identical serial I/O devices is in a reset state and must be programmed with information identifying its position within said sequential order;
    asserting said reset signal, followed by negating said reset signal;
    said first of said plurality of said identical serial I/O devices programming itself as the first in said sequential order in response to the serial input of said first of said plurality of said identical serial I/O devices being coupled to said constant logic state;
    said first of said plurality of said identical serial I/O devices providing a serial packet on its serial output after programming itself as the first in said sequential order, said serial packet containing a packet type field and a packet ID field, said packet type field containing a command that the next of said plurality of said identical serial I/O devices program itself to a position in said sequential order indicated by data within said packet ID field; and each of said plurality of said identical serial I/O devices following said first of said plurality of said identical serial I/O devices programming itself to a position in said sequential order represented by said packet ID field in the serial packet provided on its serial input when said packet type field in the serial packet contains said command, and providing a serial packet on its serial output with a delay of one clock cycle from said serial packet provided on its serial input and having a packet type field containing said command that the next of said plurality of said identical serial I/O devices program itself to a position in said sequential order indicated by data within said packet ID field, said data within said packet ID field containing the position in said sequential order of the next of said plurality of said identical serial I/O devices.

2. The method of claim 1 wherein said packet type field and said packet ID field being encoded to minimize the number of required bits.

3. A method for configuring multiple identical serial Input/Output (I/O) devices to unique addresses comprising the steps of:

providing a plurality of said identical serial I/O devices each having a serial input, a serial output, a reset input, and a clock input;

providing at least one non-identical serial I/O device having a serial input, a serial output, a reset input, and a clock input;

coupling the plurality of said identical serial I/O devices and the non-identical serial I/O device in a sequential order by coupling the serial input of the non-identical serial I/O device to a constant logic state, and by coupling the serial output of the non-identical serial I/O device to a first of said plurality of said identical serial I/O devices, each of said plurality of said identical serial I/O devices being coupled to the serial input of the next of said plurality of said identical serial I/O devices in said sequential order;

providing a clock signal to the clock input of each of said plurality of said identical serial I/O devices and to the clock input of said non-identical serial I/O device;

providing a reset signal to the reset input of each of said plurality of said identical serial I/O devices and to the reset input of said non-identical serial I/O device, the assertion of said reset signal placing each of said plurality of said identical serial I/O devices in a known configuration wherein, upon negation of said reset signal, each of said plurality of said identical serial I/O devices is in a reset state and must be programmed with information identifying its position within said sequential order;

asserting said reset signal, followed by negating said reset signal;

the assertion of said reset signal placing said non-identical serial I/O device in a known configuration wherein, upon negation of said reset signal, said non-identical serial I/O device providing a packet on its serial output in response to the serial input of said non-identical serial I/O device being coupled to said constant logic state, said serial packet containing a packet type field and a packet ID field, said packet type field containing a command that the next of said plurality of said identical serial I/O devices program itself to a position in said sequential order indicated by data within said packet ID field; and each of said plurality of said identical serial I/O devices programming itself to a position in said sequential order represented by said packet ID field in the serial packet provided on its serial input when said packet type field in the serial packet contains said command, and providing a serial packet on its serial output with a delay of one clock cycle from said serial packet provided on its serial input and having a packet type field containing said command that the next of said plurality of said identical serial I/O devices program itself to a position in said sequential order indicated by data within said packet ID field, said data within said packet ID field containing the position in said sequential order of the next of said plurality of said identical serial I/O devices.

4. The method of claim 3 wherein said packet type field and said packet ID field being encoded to minimize the number of required bits.

5. A method for configuring multiple identical serial Input/Output (I/O) devices to unique addresses comprising the steps of:

providing a plurality of said identical serial I/O devices each having a serial input, a serial output, a reset input, and a clock input;

providing at least one non-identical serial I/O device having a serial input, a serial output, a reset input, and a clock input;

coupling the plurality of said identical serial I/O devices in a sequential order by coupling the serial input of a first of said plurality of said identical serial I/O devices to a constant logic state, and by coupling the serial output of each of said plurality of said identical serial I/O devices to the serial input of the next of said plurality of said identical serial I/O devices in said sequential order;

providing a clock signal to the clock input of each of said plurality of said identical serial I/O devices and to the clock input of said non-identical serial I/O device;

providing a reset signal to the reset input of each of said plurality of said identical serial I/O devices and to the reset input of said non-identical serial I/O device, the assertion of said reset signal placing each of said plurality of said identical serial I/O devices in a known configuration wherein, upon negation of said reset signal, each of said plurality of said identical serial I/O devices is in a reset state and must be programmed with information identifying its position within said sequential order;

asserting said reset signal, followed by negating said reset signal;

said first of said plurality of said identical serial I/O devices programming itself as the first in said sequential order in response to the serial input of said first of said plurality of said identical serial I/O devices being coupled to said constant logic state;

said first of said plurality of said identical serial I/O devices providing a serial packet on its serial output after programming itself as the first in said sequential order, said serial packet containing a packet type field and a packet ID field, said packet type field containing a command that the next of said plurality of said identical serial I/O devices program itself to a position in said sequential order indicated by data within said packet ID field;

each of said plurality of said identical serial I/O devices following said first of said plurality of said identical serial I/O devices programming itself to a position in said sequential order represented by said packet ID field in the serial packet provided on its serial input when said packet type field in the serial packet contains said command, and providing a serial packet on its serial output with a delay of one clock cycle from said serial packet provided on its serial input and having a packet type field containing said command that the next of said plurality of said identical serial I/O devices program itself to a position in said sequential order indicated by data within said packet ID field, said data within said packet ID field containing the position in said sequential order of the next of said plurality of said identical serial I/O devices; and said non-identical I/O device being positioned between two of said plurality of said identical serial I/O devices, the assertion of said reset signal placing said non-identical serial I/O device in a known configuration wherein, upon negation of said reset signal, said non-identical I/O device passing said serial packet on its serial input to its serial output without changing data within said packet type field and said packet ID field.

6. The method of claim 5 wherein said packet type field and said packet ID field being encoded to minimize the number of required bits.

* * * * *